(12) United States Patent
Lee

(10) Patent No.: US 6,219,556 B1
(45) Date of Patent: Apr. 17, 2001

(54) METHOD FOR PURSUING MISSING CELLULAR TELEPHONE

(75) Inventor: Sang-Seo Lee, Seoul (KR)

(73) Assignee: Samsung Electronics Co., Inc. (KR)

( * ) Notice: Subject to any disclaimer, the term of this patent is extended or adjusted under 35 U.S.C. 154(b) by 0 days.

(21) Appl. No.: 09/114,806

(22) Filed: Jul. 13, 1998

(30) Foreign Application Priority Data

Dec. 7, 1997 (KR) .................................................. 97-32494

(51) Int. Cl.⁷ .................................................. H04Q 7/20
(52) U.S. Cl. ........................ 455/456; 455/419; 455/410; 455/411; 455/556
(58) Field of Search .................... 455/456, 419, 455/410, 411, 556; 342/457

(56) References Cited

U.S. PATENT DOCUMENTS

| | | |
|---|---|---|
| 4,700,374 | 10/1987 | Bini . |
| 5,043,736 | 8/1991 | Darnell et al. . |
| 5,095,531 | 3/1992 | Ito . |
| 5,208,756 | 5/1993 | Song . |
| 5,218,367 | 6/1993 | Sheffer et al. . |
| 5,327,144 | 7/1994 | Stilp et al. . |
| 5,389,934 | 2/1995 | Kass . |
| 5,418,537 | 5/1995 | Bird . |
| 5,428,545 | 6/1995 | Shah et al. . |
| 5,428,546 | 6/1995 | Shah et al. . |
| 5,432,841 | 7/1995 | Rimer . |
| 5,512,908 | 4/1996 | Herrick . |
| 5,519,760 | 5/1996 | Borkowski et al. . |
| 5,548,296 | 8/1996 | Matsuno . |
| 5,550,551 * | 8/1996 | Alesio ................................ 342/457 |
| 5,587,715 | 12/1996 | Lewis . |
| 5,594,425 | 1/1997 | Ladner et al. . |
| 5,594,650 | 1/1997 | Shah et al. . |
| 5,610,615 | 3/1997 | Chiodini . |
| 5,612,703 | 3/1997 | Mallinckrodt . |
| 5,625,668 | 4/1997 | Loomis et al. . |
| 5,629,710 | 5/1997 | Sawada . |
| 5,630,206 | 5/1997 | Urban et al. . |
| 5,646,632 | 7/1997 | Khan et al. . |
| 5,650,770 | 7/1997 | Schlager et al. . |
| 5,652,707 | 7/1997 | Wortham . |
| 5,669,061 | 9/1997 | Schipper . |
| 5,697,064 | 12/1997 | Okamoto et al. . |
| 5,777,580 * | 7/1998 | Janky et al. ........................ 342/457 |
| 5,832,394 * | 11/1998 | Wortham ............................. 455/419 |
| 5,929,752 * | 7/1999 | Janky et al. ........................ 455/422 |

* cited by examiner

*Primary Examiner*—Daniel Hunter
*Assistant Examiner*—Lana Le
(74) *Attorney, Agent, or Firm*—Dilworth & Barrese, LLP

(57) ABSTRACT

A system and method for pursuing a missing cellular telephone are provided. The cellular telephone analyzes a control signal received from a mobile communication network. If the analyzed control signal corresponds to a missing mode setting signal, the cellular telephone enters a missing mode and transmits a position signal representing the current location at regular intervals. In the meantime, upon receipt of a missing mode release signal from the mobile communication network, the cellular telephone releases the missing mode. Further, the cellular telephone transmits the position signal at regular intervals beginning at termination of an incoming or outgoing call, when the missing cellular telephone answers the incoming call or makes the outgoing call in the missing mode.

19 Claims, 4 Drawing Sheets

METHOD FOR PURSUING MISSING CELLULAR TELEPHONE

BACKGROUND OF THE INVENTION

1. Field of the Invention

The present invention relates to a system and method for pursuing a missing mobile communication terminal, and in particular, to a system and method for pursuing a missing cellular telephone.

2. Description of the Related Art

A mobile communication terminal includes a unidirectional pager, a bidirectional pager, a personal digital assistant (PDA), and a cellular telephone. With the advance of the mobile communication technology, the communication terminal has decreased in price and the charge rate for the communication service also has decreased. Accordingly, the communication terminal has come into wide use.

Among the above mentioned mobile communication terminals, the PDA and the cellular telephone are typical bidirectional mobile communication terminals, which provide a voice or data communication service. The position of the mobile communication terminal is changed according to the movement of the user. Thus, in a conventional method for pursuing the mobile terminal, the cellular telephone notifies its position to a base station at irregular intervals. Then, the base station transmits the received positional information of the cellular telephone to a mobile telephone switching office (MTSO) and stores it in a home location register (HLR) of the MTSO.

Conventionally, since the cellular telephone transmits its positional information to the MSTO at irregular intervals, it is difficult to determine an accurate position of the cellular telephone. Accordingly, when the cellular telephone is missing, the user (i.e., the possessor) of the cellular telephone cannot determine the accurate position of the missing cellular telephone. In some cases, the finder may use the missing cellular telephone fraudulently.

Therefore a need exists for an improved method of locating a missing mobile communication terminal.

SUMMARY OF THE INVENTION

It is therefore an object of the present invention to provide a method for pursuing or locating an accurate position of a missing cellular telephone.

To achieve the above object, the present invention provides a method for pursuing a missing cellular telephone. The cellular telephone analyzes a control signal received from a mobile communication network. If the analyzed control signal corresponds to a missing mode setting signal, the cellular telephone enters a missing mode and transmits a position signal representing a current location at regular intervals. In the meantime, upon receipt of a missing mode release signal from the mobile communication network, the cellular telephone exits the missing mode.

Preferably, the cellular telephone transmits the position signal at regular intervals beginning at termination of an outgoing call, when the missing cellular telephone makes the outgoing call in the missing mode.

Further, the cellular telephone transmits the position signal at regular intervals beginning at termination of an incoming call, when the missing cellular telephone answers the incoming call in the missing mode.

A method for pursuing a missing cellular device, includes the steps of, upon receipt of a control signal from a mobile communication network, analyzing the received control signal, entering a missing mode and transmitting a position signal representing a current location of the cellular device at regular intervals, when the analyzed control signal corresponds to a missing mode setting signal, determining whether a missing mode release signal is received from the mobile communication network and releasing the missing mode, upon receipt of the missing mode release signal.

A system for locating a missing cellular device, having a controller, wherein the controller includes means for entering a missing mode and transmitting a position signal representing a current location of the cellular device at regular intervals, upon receipt of a control signal from a mobile communication network, the transmission of the position signal occurring when the analyzed control signal corresponds to a missing mode setting signal. Means for analyzing the received control signal and means for determining whether a missing mode release signal is received from the mobile communication network are also included. Means for releasing the device from missing mode, upon receipt of the missing mode release signal.

The cellular device may includes a cellular telephone, a personal digital assistant or a cellular pager.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

An embodiment of the present invention will be described in detail hereinbelow with reference to the accompanying drawings. In order to facilitate a comprehensive understanding, the present invention will be illustratively described with reference to a specific embodiment. In the following description, well-known functions or constructions which may obscure the present invention in unnecessary detail are not described in detail herein.

Figure 1:
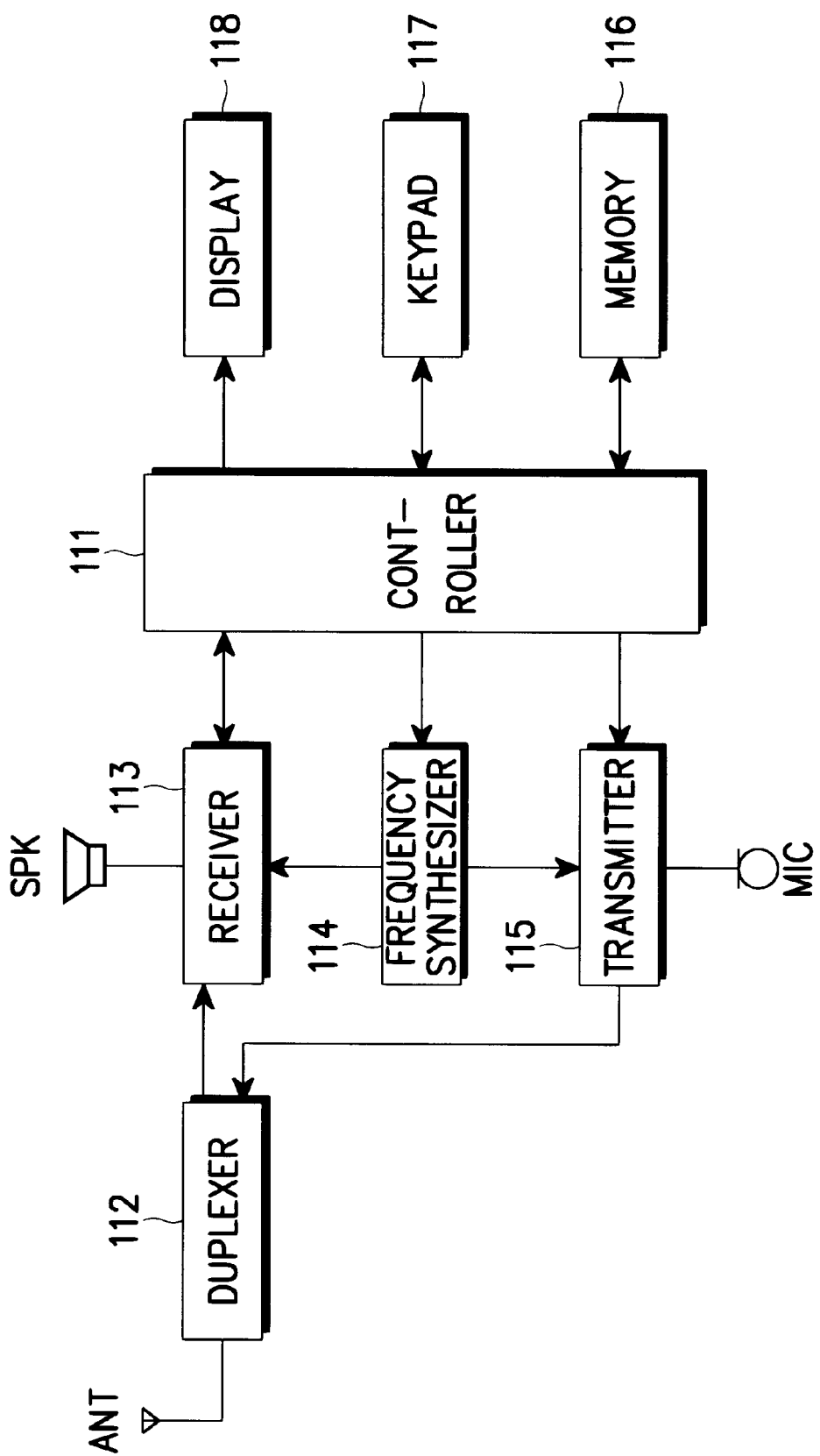
FIG. 1 is a block diagram of a cellular telephone to which the present invention is applied.

FIG. 1 shows a block diagram of a cellular telephone to which the present invention is applied. Referring to FIG. 1, a controller 111, preferably a microprocessor, controls the overall operations of the cellular telephone. In particular, upon receipt of a missing mode setting signal from a mobile communication network, the controller 111 transmits a position signal representing the present position of the cellular telephone to the mobile telephone switching office (MTSO) at regular intervals. A duplexer 112 outputs an RF (Radio Frequency) signal received through an antenna ANT to a receiver 113 and outputs a transmission signal received from a transmitter 115 to the antenna ANT. The receiver 113, under the control of the controller 114, synthesizes the signal input from the duplexer 112 with a signal input from a frequency synthesizer 114, to output an audio signal to a speaker SPK and a control signal to the controller 111. The frequency synthesizer 114 provides the receiver 113 with the frequency for removing a carrier frequency from the received signal and provides the transmitter 115 with a transmission carrier frequency, under the control of the controller 111. The transmitter 115 synthesizes an audio signal input from a microphone MIC with the carrier frequency input from the frequency synthesizer 114, and outputs the synthesized signal to the duplexer 112. A memory 116 is divided into a program memory for storing a control program of the cellular telephone and a data memory for storing data generated during operations of the cellular telephone and data input by the user. A keypad 117, having a key matrix, outputs key input signals to the controller 111 according to the user's key operation. A display 118 displays the operational status of the cellular telephone under the control of the controller 111.

Figure 2:
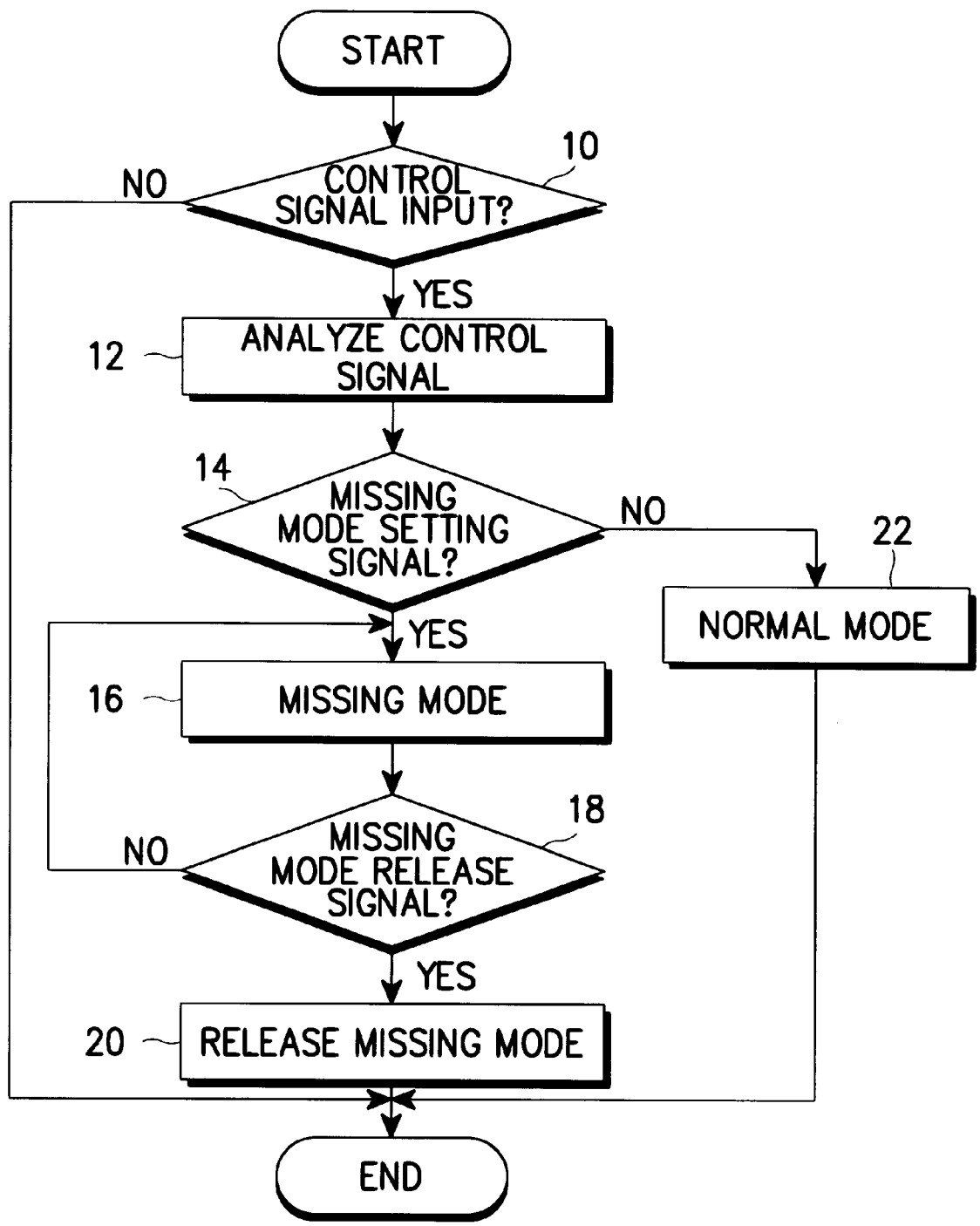
FIG. 2 is a flow chart illustrating the procedure for pursuing a missing cellular telephone according to an embodiment of the present invention.

FIG. 2 shows a flow chart illustrating the procedure for pursuing a missing cellular telephone according to an embodiment of the present invention.

Referring to FIGS. 1 and 2, the controller 111 determines in step 10 whether a control signal is received from the receiver 113. Upon receipt of the control signal, the controller 111 analyzes the received control signal in step 12, and determines in step 14 whether the analyzed control signal corresponds to a missing mode setting signal. If it corresponds to the missing mode setting signal, the controller 111 performs a missing mode in step 16, and otherwise, performs a normal mode in step 22. In the step 16, the controller 111 reads a program for the missing mode from the memory 116 and enters the missing mode. Meanwhile, the controller 111 determines in step 18 whether a control signal corresponding to a missing mode release signal is received from the receiver 113. If the missing mode release signal is received, the controller 111 proceeds to step 20 to release the missing mode, and otherwise, returns to the step 16 to continue performing the missing mode until the device such as a cellular telephone has been located according to the transmitted position signal.

Figure 3A:
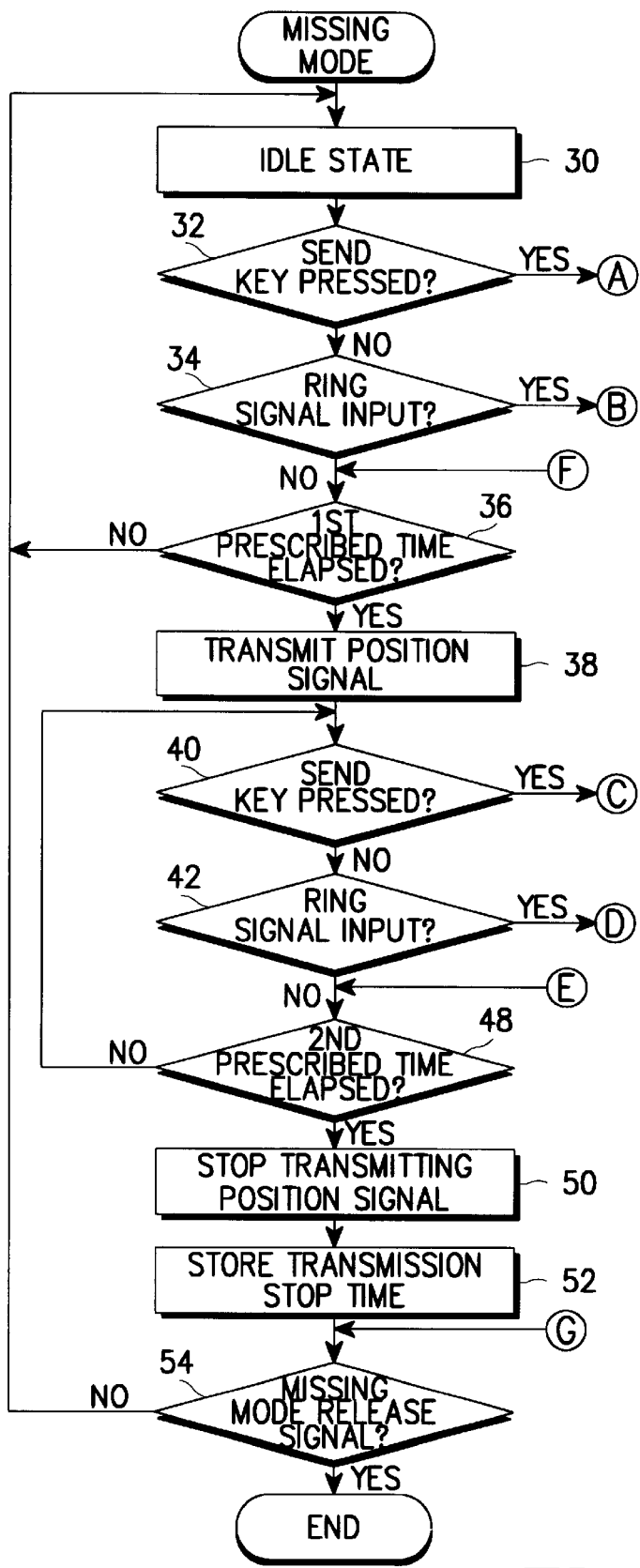
FIGS. 3A and 3B are flow charts illustrating the procedure for performing a missing mode (16) of FIG. 2 according to an embodiment of the present invention.
Figure 3B:
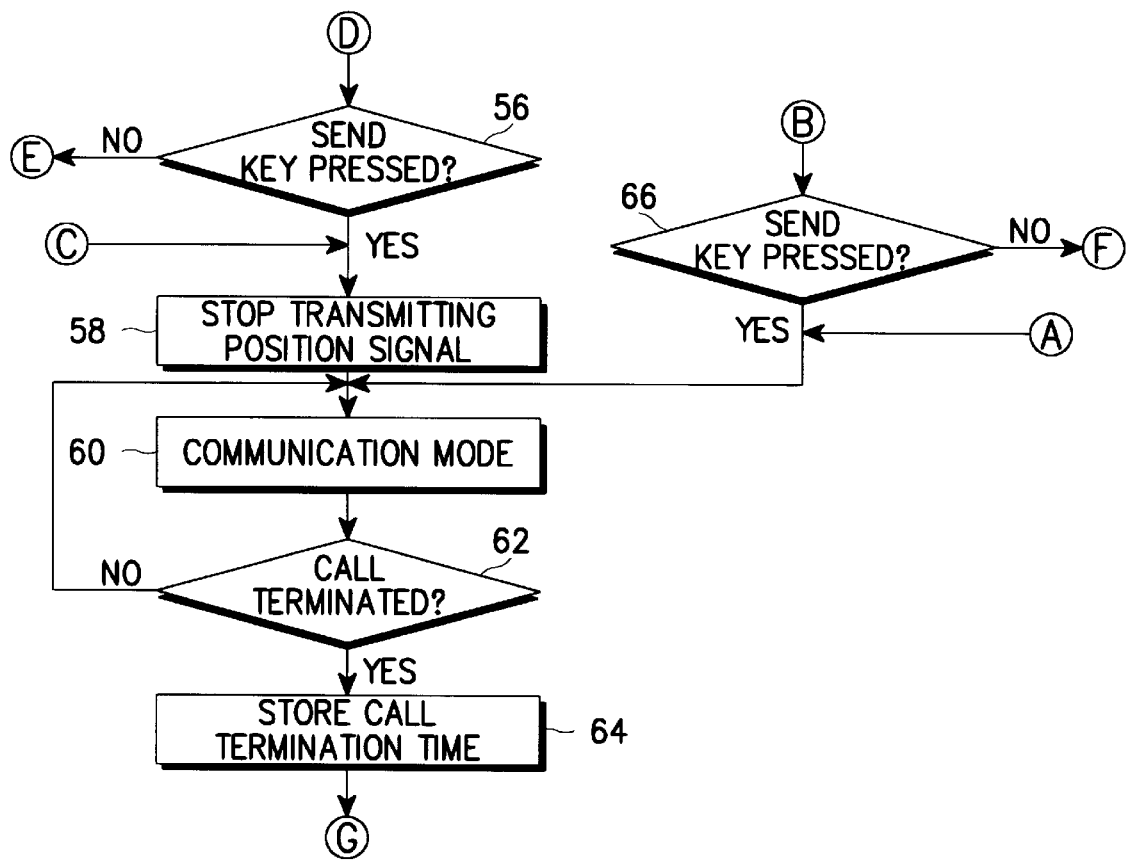

FIGS. 3A and 3B show flow charts illustrating the procedure for performing the missing mode according to an embodiment of the present invention.

Now, reference will be made to an operation of the missing mode with reference to FIGS. 1 to 3B. Upon entering the missing mode in the step 16 of FIG. 2, the controller 111 transmits a position signal representing the present location of the cellular telephone and maintains an idle state in step 30. Meanwhile, in step 32, the controller 111 determines whether the user depresses a communication key (i.e., a SEND key) on the keypad 117 to make an outgoing call. If the communication key is depressed, the controller 111 proceeds to step 60 to perform a communication mode. If the communication key is not depressed, the controller 111 determines in step 34 whether the receiver 113 has received a ring signal for an incoming call from the mobile communication network (or the base station). Upon receipt of the ring signal for the incoming call, the controller 111 sees if the user depresses the communication key on the keypad 117 to answer the incoming call. If the ring signal is not received, the controller 111 determines in step 36 whether a first prescribed time has elapsed. Here, the first prescribed time corresponds to a time interval between the last transmission time for the position signal and the current transmission time for the position signal. The first prescribed time may be freely set by the user or fixedly set in a manufacturing process of the cellular telephone.

If the first prescribed time has not elapsed, the controller 111 returns to the step 30, and otherwise, proceeds to step 38 to transmit the position signal representing the current location of the cellular telephone. In this way, the cellular telephone transmits the position signal at an interval of the first prescribed time. After transmission of the position signal, the controller 111 determines in step 40 whether the user depresses the communication key on the keypad 117 to make an outgoing call. If the communication key is depressed, the controller 111 proceeds to step 58 to stop transmitting the position signal, and otherwise, proceeds to step 42 to determine whether the ring signal for an incoming call is received from the receiver 113. If the ring signal is received, the controller 111 proceeds to step 56 to determine whether the user depresses the communication key on the keypad 117 to answer the incoming call, and otherwise, proceeds to step 48 to see if a second prescribed time has elapsed. Here, the second prescribed time corresponds to a time interval during which transmission of the position signal lasts. If the second prescribed time has not elapsed, the controller returns to the step 40, and otherwise, proceeds to step 50 to stop transmitting the position signal. Then, in step 52, the controller 111 stores the transmission stop time in a position table of the memory 116. Here, the position table stores the time when the cellular telephone transmitted the last position signal and the time when the cellular telephone terminated the last call. After storage of the transmission stop time, the controller 111 determines in step 54 whether the missing mode release signal is received from the receiver 113. If the missing mode release signal is not received, the procedure returns to step 30. However, upon receipt of the missing mode release signal, the controller 111 ends the missing mode.

In addition, if the communication key is not depressed in the step 56, the procedure goes to the step 48. However, if the user depresses the communication key in the step 56 to make or answer the call, the controller 111 stops transmitting the position signal in step 58 and then proceeds to step 60. Furthermore, if the communication key on the keypad 117 is not depressed in the step 66, the procedure returns to the step 36. However, if the user depresses the communication key to make or answer the call, program proceeds to the step 60. In step 60, the controller 111 enters the communication mode. In the meantime, the controller 111 determines in step 62 whether the user terminates the call by depressing a call termination key (i.e., an END key). If the call is not terminated, the procedure returns to the step 60. However, if the call is terminated, the controller 111 stores the call termination time in the position table of the memory 116 in step 64 and returns to the step 54.

As described heretofore, the cellular telephone of the invention transmits the position signal representing the current location to the MTSO at regular intervals in response to the missing mode setting signal received from the mobile communication network. Therefore, the MTSO can accurately pursue the missing cellular telephone by analyzing the position signal transmitted at regular intervals from the missing cellular telephone.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A method for pursuing a missing cellular device, comprising the steps of:

upon receipt of a control signal from a mobile communication network, analyzing the received control signal;

entering a missing mode and transmitting a position signal representing a current location of the cellular device at regular intervals, when the analyzed control signal corresponds to a missing mode setting signal;

transmitting the position signal at regular intervals beginning at termination of an operation, when the missing cellular device completes an operation in the missing mode;

determining whether a missing mode release signal is received from the mobile communication network; and releasing the missing mode, upon receipt of the missing mode release signal.

2. The method as claimed in claim 1, further comprising the step of locating the cellular device according to the position signal.

3. The method as claimed in claim 1, further comprises the step of switching to a communication mode from the missing mode when a send signal is input to the cellular device.

4. The method as claimed in claim 1, further comprises the step of switching to a communication mode from the missing mode when a ring signal is transmitted to the cellular device.

5. The method as claimed in claim 1, wherein the cellular device includes a cellular telephone.

6. The method as claimed in claim 1, wherein the cellular device includes a cellular personal digital assistant.

7. The method as claimed in claim 1, wherein the cellular device includes a cellular pager.

8. The method as claimed in claim 1, wherein the operation is one of an incoming operation and an outgoing operation.

9. A method for pursuing a missing cellular telephone, comprising the steps of:

upon receipt of a control signal from a mobile communication network, analyzing the received control signal;

entering a missing mode and transmitting a position signal representing a current position of the cellular telephone at regular intervals, when the analyzed control signal corresponds to a missing mode setting signal;

transmitting the position signal at regular intervals beginning at termination of a call, when the missing cellular telephone completes a call in the missing mode; and releasing the missing mode, upon receipt of a missing mode release signal from the mobile communication mode.

10. The method as claimed in claim 9, further comprising the step of locating the cellular telephone according to the position signal.

11. The method as claimed in claim 9, further comprises the step of switching to a communication mode from the missing mode when a send signal is input to the cellular telephone.

12. The method as claimed in claim 9, further comprises the step of switching to a communication mode from the missing mode when a ring signal is transmitted to the cellular telephone.

13. The method as claimed in claim 9, wherein the call is one of an incoming call and an outgoing call.

14. A system for locating a missing cellular device, including a controller comprising:

means for entering a missing mode and transmitting a position signal representing a current location of the cellular device at regular intervals, upon receipt of a control signal from a mobile communication network, the transmission of the position signal occurring when the analyzed control signal corresponds to a missing mode setting signal;

means for analyzing the received control signal;

means for transmitting the position signal at regular intervals beginning at termination of an operation, when the missing cellular device completes an operation in the missing mode;

means for determining whether a missing mode release signal is received from the mobile communication network; and means for releasing the missing mode, upon receipt of the missing mode release signal.

15. The system as claimed in claim 1, wherein the controller includes a microprocessor.

16. The system as claimed in claim 14, wherein the cellular device includes a cellular telephone.

17. The system as claimed in claim 14, wherein the cellular device includes a cellular personal digital assistant.

18. The system as claimed in claim 14, wherein the cellular device includes a cellular pager.

19. The system as claimed in claim 14, wherein the operation is one of an incoming operation and an outgoing operation.

* * * * *